United States Patent

Johnson

[15] 3,639,996
[45] Feb. 8, 1972

[54] SCREW THREAD GAGE WITH ALIGNER

[72] Inventor: Lowell C. Johnson, West Granby, Conn.

[73] Assignee: The Johnson Gage Company, Bloomfield, Conn.

[22] Filed: Mar. 26, 1969

[21] Appl. No.: 810,562

[52] U.S. Cl. ..................................................33/199
[51] Int. Cl. ..................................................G01b 3/00
[58] Field of Search ....................33/199 A, 147 M

[56] References Cited

UNITED STATES PATENTS

| | | | |
|---|---|---|---|
| 2,413,533 | 12/1946 | Wainwright | 33/199 A |
| 2,586,114 | 2/1952 | Swanson | 33/199 A |
| 2,720,034 | 10/1955 | Wills | 33/199 A |
| 2,770,050 | 11/1956 | Johnson | 33/199 A |
| 2,842,862 | 7/1958 | Johnson | 33/199 A |
| 3,008,240 | 11/1961 | Johnson | 33/199 A |
| 3,222,793 | 12/1965 | Johnson | 33/199 A |

*Primary Examiner*—Leonard Forman
*Assistant Examiner*—Dennis A. Dearing
*Attorney*—John M. Montstream

[57] ABSTRACT

The invention relates to a screw thread gage having two or three thread-gaging elements, preferably rolls, and includes an aligner having an arcuate surface bearing screw thread means. The aligner is pivotally mounted at one end thereof adjacent to one of the gaging elements. The aligner assures that there will be no cross threading. For a test part having an external thread, the test part is laid in the threaded arcuate surface whereupon the aligner and test part are pivoted into gaging position between the gaging elements. For a test part having an internal thread the gaging elements are contracted and inserted in the test thread and the aligner is pivoted into engagement with the test thread whereupon the gaging elements are expanded into contact with the test thread with the aligner engaging the thread. The aligner may also serve as a part of a back stop in a two-element gage for retaining the test part in gaging position.

16 Claims, 17 Drawing Figures

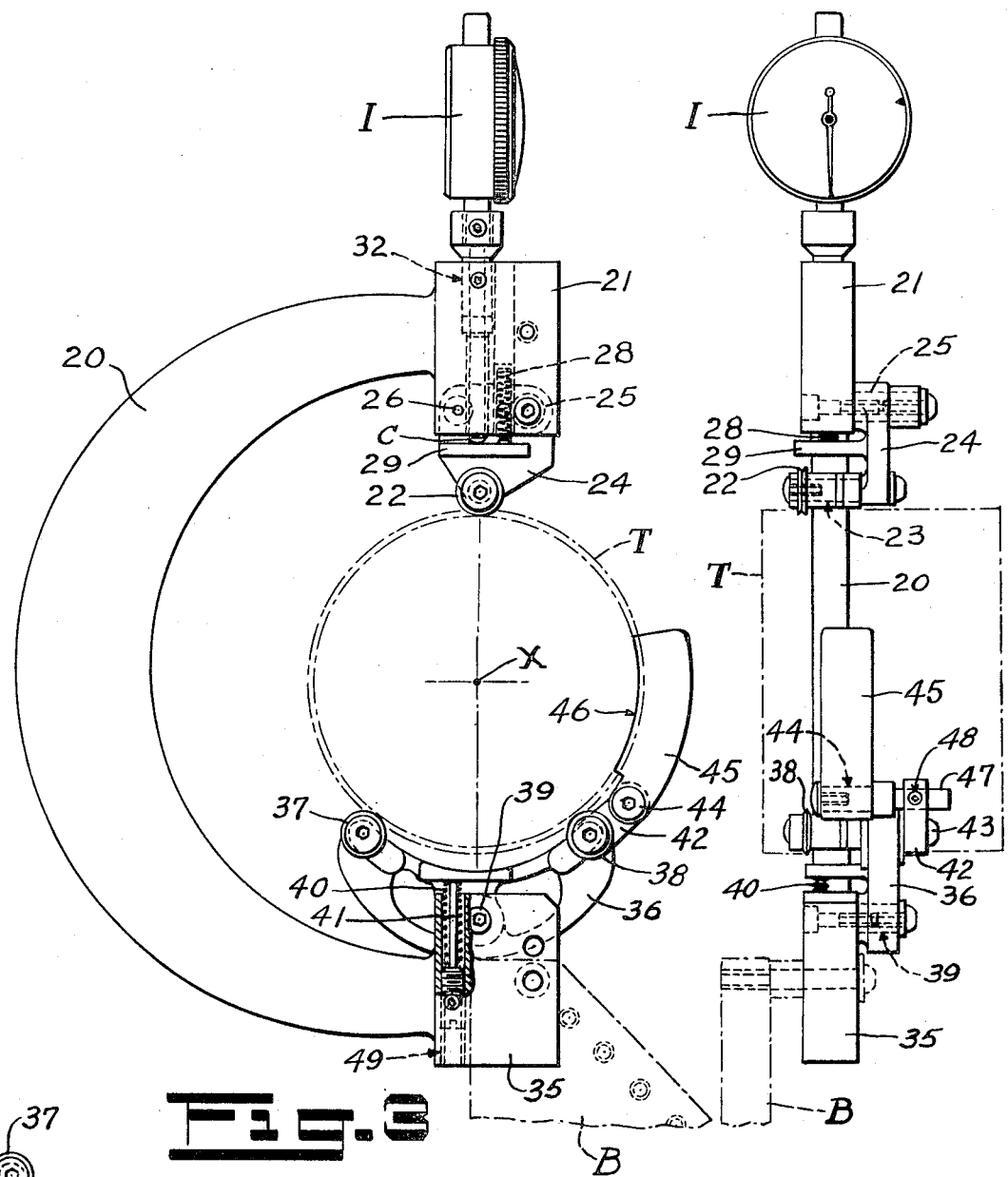
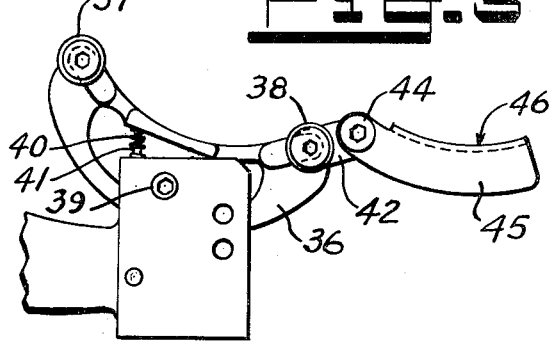

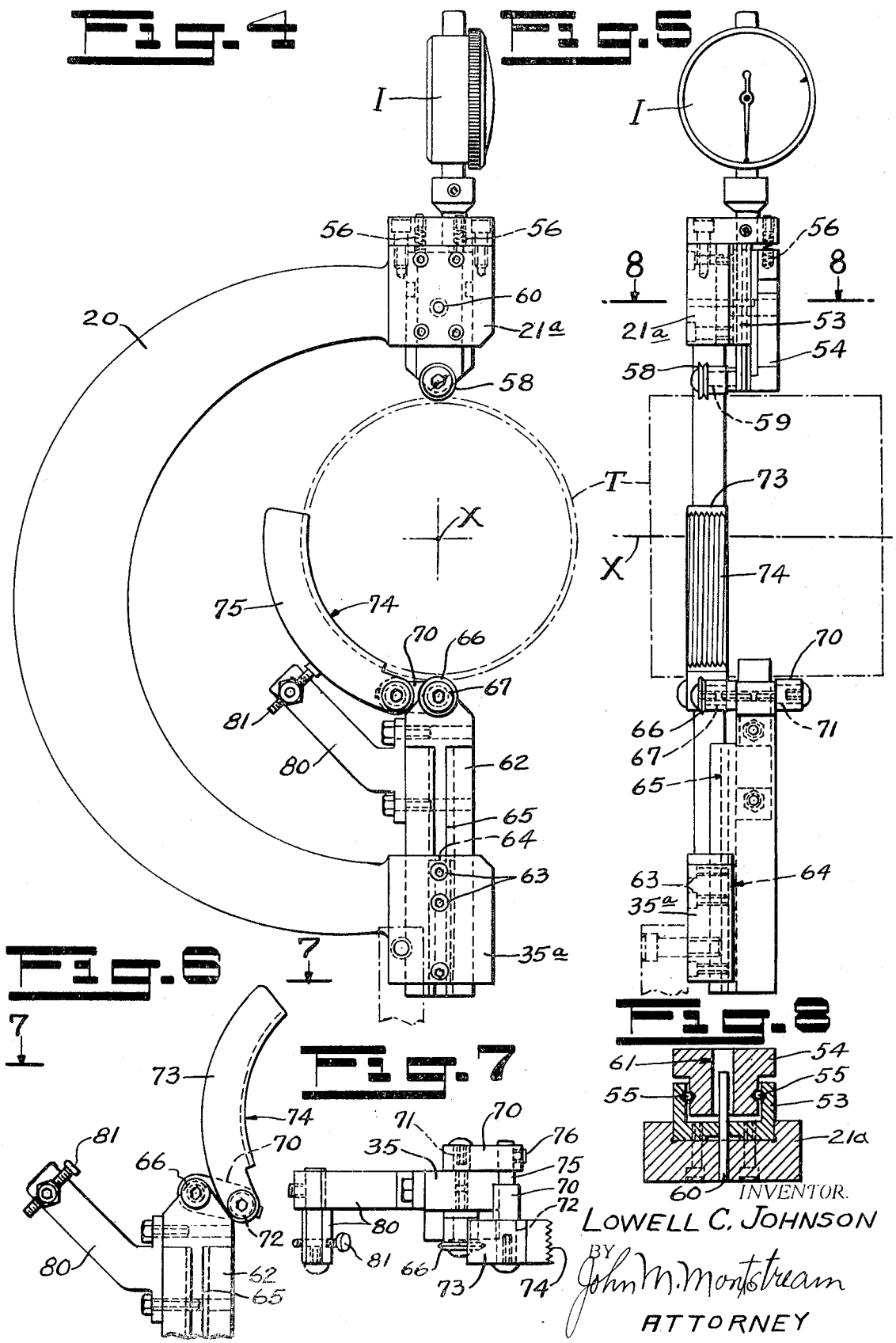

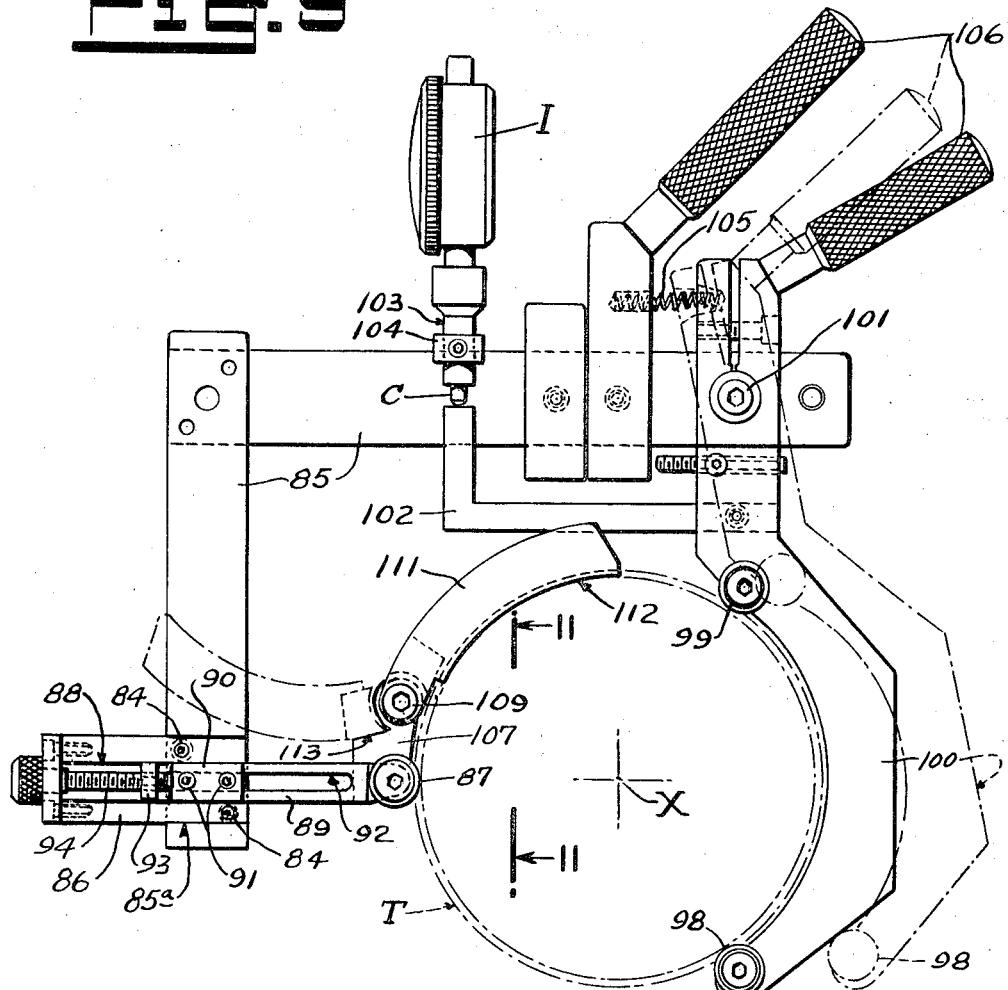
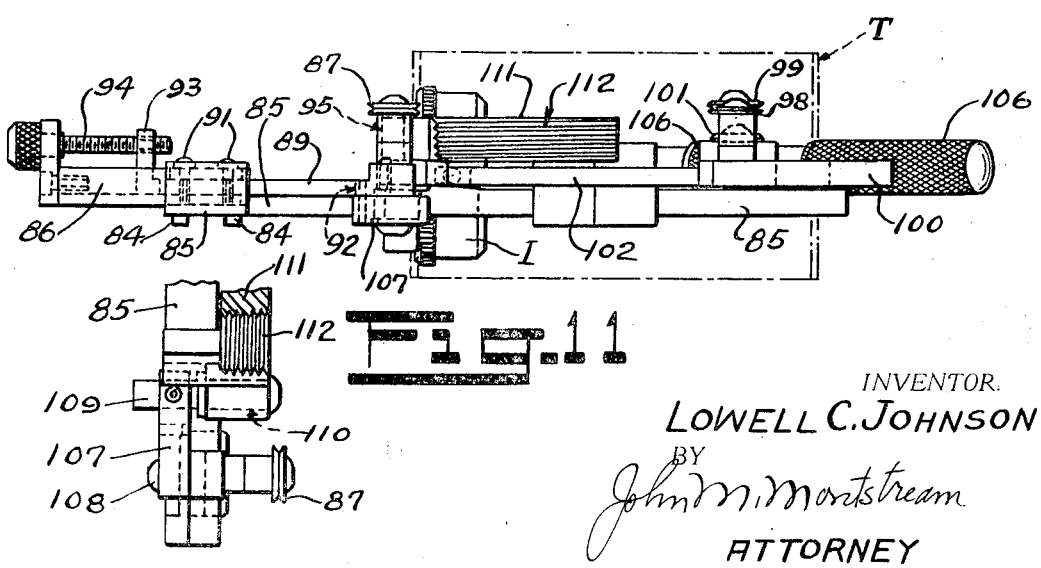

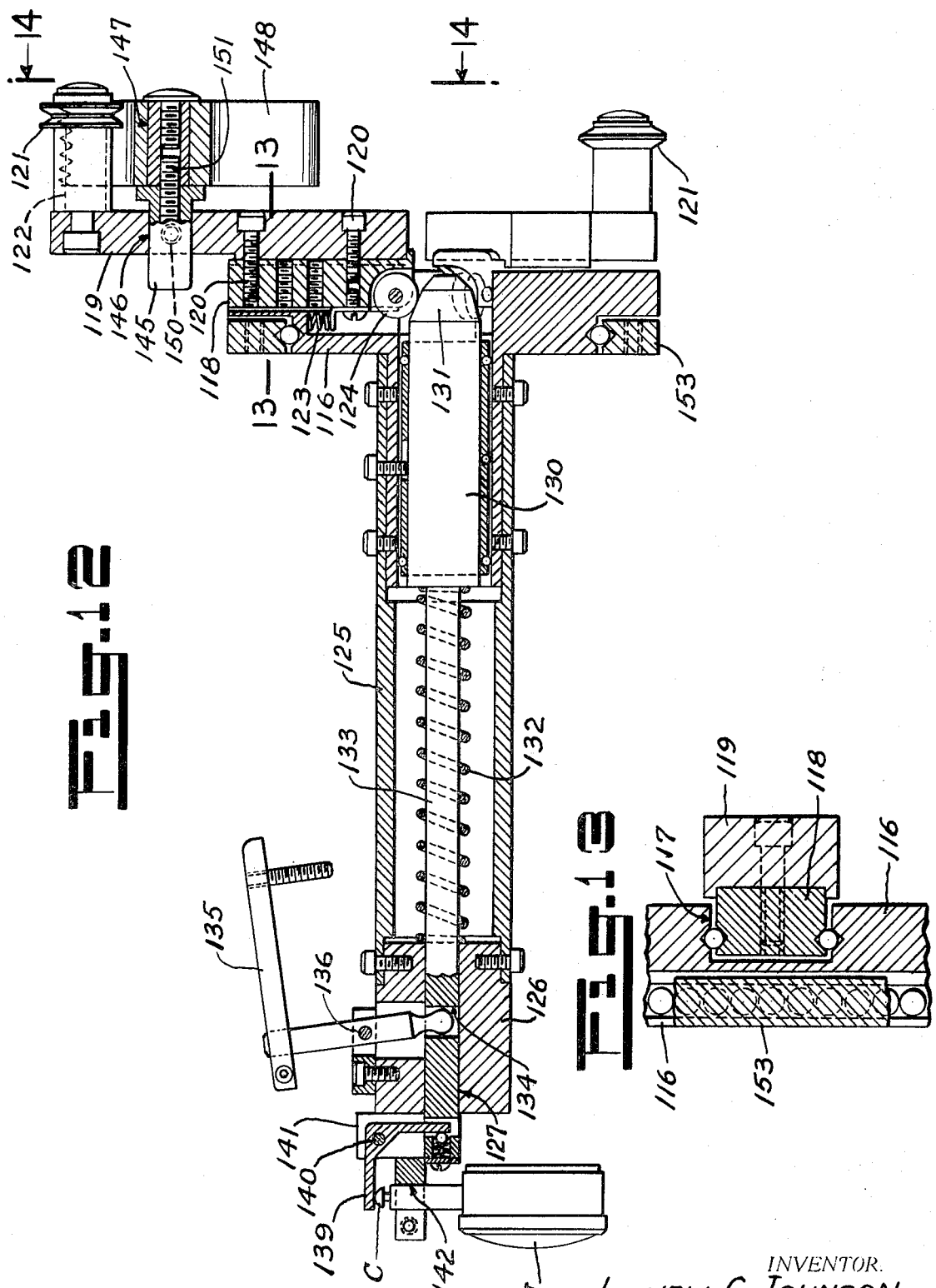

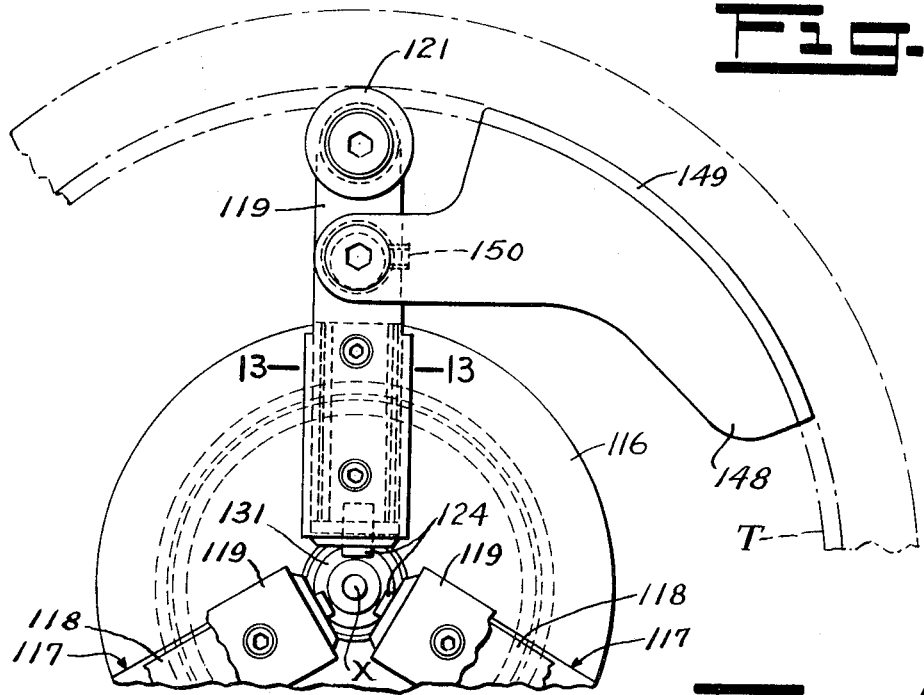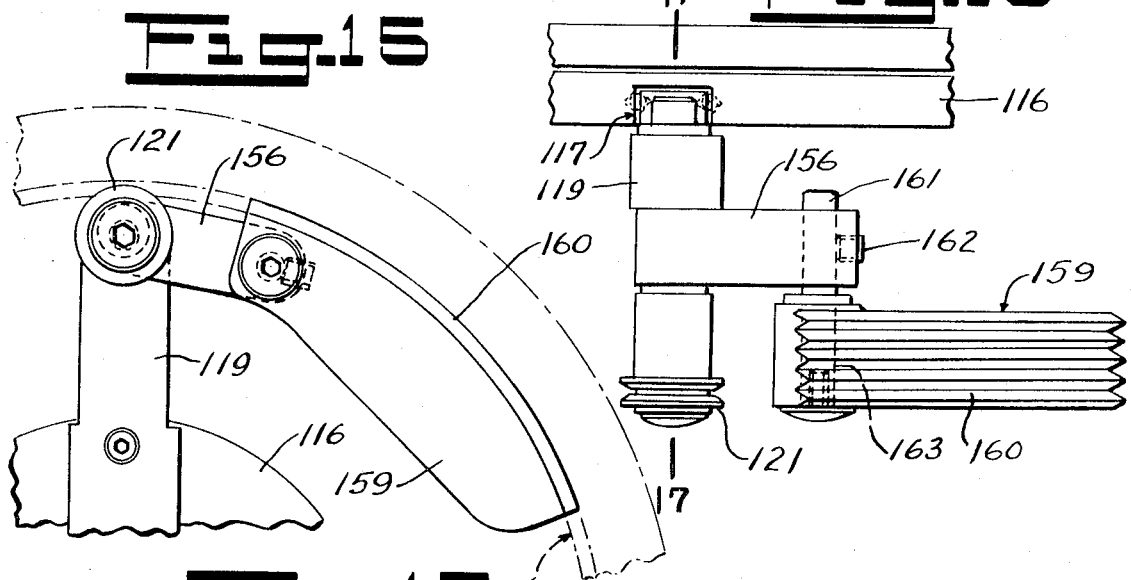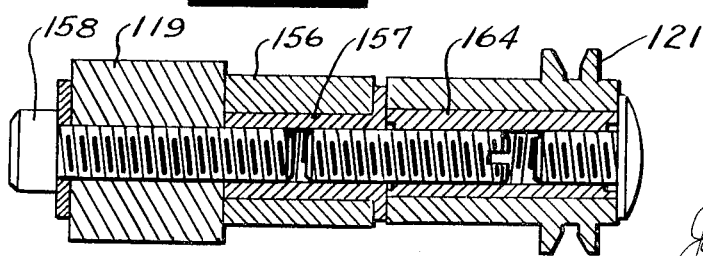

SCREW THREAD GAGE WITH ALIGNER

In presenting a screw thread to be gaged for dimension to a gage having gaging elements of small circumferential dimension, such as gaging rolls, it is difficult much of the time to be sure that the test thread T is actually engaging a thread ridge or groove on one side and the proper groove or ridge diametrically opposite thereto or closely opposite when the gage is a three-element gage, which is the dimension to be gaged. Such improper engagement of threads is called cross-threading. With large-diameter screw threads, it is easy to insert a test thread into the gage with a gaging element or elements on one side engaging an adjacent thread ridge or groove rather than the proper diametrically opposite thread groove or ridge. The difficulty in properly inserting the test thread is increased when the thread is a fine or higher pitch thread and it increases also with diameter. A test thread so positioned in a gage will give an erroneous reading as to the diameter of the thread. The problem of cross threading exists with both types of gages that is one which uses two diametrically opposite gaging elements for contact across the diameter of the test thread or a gage which uses three gaging elements which are circumferentially or angularly spaced to engage the test thread at three angularly spaced points or positions on the circumference. The spacing of the three gaging elements may be 120° apart or any other desired angular relationship. The problem of cross threading exists as well with a gage for an internal thread. The gage to be described carries an aligner or anti-cross-threading means so that the screw thread of the test part is presented to the gaging elements at a diametrically opposite portion of the thread helix for a gage having two gaging elements or essentially diametrically opposite portion of the test thread for a gage having three spaced gaging elements, bearing in mind that the screw thread is a helix. The aligner assures that there will not be cross threading of the test part between or within the gaging elements.

It is an object of the invention to construct a screw thread gage using thread-gaging elements of small circumferential dimension having a thread aligner which is mounted on the gage adjacent to one of the gaging elements with the threads of the aligner in helical alignment with the engaging ridge or groove or ridges and grooves of the adjacent gaging element so that a test part can be laid in the screw thread means of the aligner and the aligner and test thread is positioned in proper gaging position in contact with the gaging elements and thereby avoid cross threading.

A further object is as above but provides a pivotal mounting for the aligner.

Another object is as in the preceding paragraphs and, in addition the aligner may serve as a part of a positive backstop for the test thread and retaining the test thread in gaging position for a gage having solely two gaging elements with the elements being diametrically opposite each other.

Another object is as in the preceding paragraphs and in which the gage is constructed for an internal thread.

Other objects of the invention will be more apparent from the following description when taken in connection with the accompanying drawings illustrating preferred embodiments thereof in which:

FIG. 1 is a side view of a thread gage having three gaging elements;

FIG. 2 is a front view of the gage of FIG. 1;

FIG. 3 is a partial side view of the gage and aligner in open position;

FIG. 4 is a side view of a gage having two gaging elements and an aligner with a backstop;

FIG. 5 is a front view of the gage of FIG. 4;

FIG. 6 is a side view of a portion of the gage of FIG. 4 with the aligner in open position;

FIG. 7 is a top view taken from line 7—7 of FIG. 6;

FIG. 8 is a section taken on line 8—8 of FIG. 5;

FIG. 9 is a side view of a gage having three gaging elements and an aligner;

FIG. 10 is a view into the gage of FIG. 9;

FIG. 11 shows an aligner mounting;

FIG. 12 is a sectional view of a gage for an internal thread having an aligner;

FIG. 13 is enlarged section taken on line 13—13 of FIG. 12;

FIG. 14 is a partial front view of the gage of FIG. 12 taken on line 14—14;

FIG. 15 is a partial view of the gage of FIG. 12 with the aligner being differently located;

FIG. 16 is a partial top view of FIG. 15; and

FIG. 17 is an enlarged section through the roll and aligner mounting.

The thread gages illustrated are common forms and have an aligner or an anti-cross-threading means pivotally carried thereon. The gage of FIG. 1 includes a main frame 20 at one end of which there is a head 21 which mounts a single gaging element 22. When the gaging element is a roll it is rotatably mounted on an eccentric stud 23. This gaging element is movable radially or generally radially by being mounted on a bracket 24 carried by a pivot 25 on the head. The extent of pivotal movement is limited by a suitable stop such as a stop-pin 26 on the head projecting into a stop hole 27 in the bracket 24. The bracket and its gaging element is suitably pressed towards cooperating gaging means by a spring 28 received in a hole in the frame head and engaging a flange 30 on the bracket.

The head carries indicator mounting means 32, shown as a socket or hole 32, in which the stem of an indicator I is received. The indicator mounting means is located so that the contactor C of the indicator engages the bracket or a flange 29 thereon and indicates the position of the gaging element when a test thread is in gaging position. The contactor preferably engages the gaging element bracket at a point spaced from the pivot depending upon the angularity between the cooperating gaging elements as will appear.

The other end of the main frame carries a similar head 35 on which is mounted cooperating gaging means which includes a gaging element frame 36 having two spaced gaging elements 37 and 38 carried thereby. Each of these gaging elements may be rolls mounted for rotation on a stud which preferably is eccentric. The gaging element frame is pivoted on a pivot 39 located generally midway between the two gaging elements but below the midpoint. When in gaging position the three gaging elements may be located 120° apart or at any other angle, such as that illustrated in which the two gaging elements on the gaging element frame are located 75° apart with respect to the gage center or gage axis X or to the axis of a test thread in gaging position. The other two angles between elements 22, 37 and 22, 38 are equal when in gaging position. Although this gaging element frame pivots, it is however, radially fixed on the pivot 39 with respect to the first gaging means. A spring 40 may propel the gaging element frame to open position. A stop 41 threaded into a hole 49 and within the spring limits the pivotal movement of the gaging element frame 36 in a counterclockwise direction to gaging position.

It is immaterial which gaging means is mounted for radial, or generally radial movement, which movement, or position of which, is used to indicate the diameter of the test thread. As a practical matter it is simpler for the single gaging element 22 to have the radial movement. Gaging roll 22 is shown as having a single V peripheral gaging ridge for engaging opposite flanks of the thread and rolls 37 and 38 are shown as having a single-cone peripheral gaging ridge for engaging in a thread groove. Gaging elements with a single V or cone are used primarily for gaging pitch diameter. Each gaging roll may have a plurality of gaging ridges. The gage may be portable and carried to the test part or may be mounted on a base B.

The gaging element frame of the cooperating gaging means carries an aligner arm 42 secured to the gaging means frame by a screw 43 so that the arm forms a part of this frame. This arm carries an aligner pivot 44 adjacent to one of the gaging elements preferably the outer one. An aligner 45 is mounted on this pivot which aligner has an arcuate surface, which is concave for an external thread, and this concave surface carries screw thread means 46 comprising at least one thread ridge or groove and preferably a plurality of screw thread ridges, corresponding with the screw thread of the test part. The thread ridges of the aligner are in helical alignment with the thread ridge or ridges of its adjacent gaging element or roll when the aligner itself is located in alignment with the gaging element. The aligner may be offside, as shown, from the general plane of the gaging ridges of the gaging elements in which event the threads of the screw thread means of the aligner are again located to be in the proper helical alignment with the adjacent gaging elements 38 although spaced laterally therefrom so that the test thread T when received by the screw thread means of the aligner will be properly positioned in helical alignment with the adjacent thread gaging element and hence with the other gaging elements.

The pivot for the aligner is located in any suitable position relative to its adjacent gaging element so that when a test thread is in its proper position between the gaging elements, the screw thread means of the aligner corresponds with the periphery of the test part when engaging the gaging elements or in the proper spaced helical alignment or relationship to the gaging means ridges. The axis of the aligner pivot should be parallel with the gage axis X and the axis of the screw thread means should correspond with the axis of the gage when a test thread is in gaging position. The screw thread means need not have the preciseness of the threads of a thread-gaging segment since its function is primarily to align the test thread with the gaging elements although the aligner also will function in all constructions to prevent twisting of the test part when gaging. The screw thread means is of sufficient circumferential dimension to assure anti-cross-threading and the concave surface shown is roughly one-eighth of the circumference of the test part. It could have a peripheral contact of less than an eighth of the circumference but avoiding anti-cross-threading is not as easy. The aligner could be longer but without any material advantage.

The aligner preferably has axial adjustment means to helically align the screw thread means 46 with the adjacent gaging element 38, that shown including an extension 47 of the aligner pivot and a lock screw 48 in the aligner arm 42.

Although the aligner is pivotally mounted it could just as well be fixed if the aligner arm and the aligner were located adjacent to the gaging element 37 or on the inner side with respect to the main frame. Indeed it can also be fixed when mounted as illustrated with sufficient extent of pivotal movement of the gaging element frame 36 to open the cooperative gaging elements and aligner to receive the test thread without interference with the first gaging element 22.

In using the gage of FIG. 1, the cooperating gaging means is pivoted to open position as shown in FIG. 3, and the aligner 45 is pivoted horizontally. The test thread is laid on the screw thread means 46 of the aligner whereupon the aligner and test thread is pivoted on pivot 44 until the test thread rests on the gaging elements 37 and 38. The aligner, the gaging element frame 36 and the test part is then pivoted on pivot 39 until the stop 41 is engaged. The test part is then in gaging position as shown in FIG. 1. The position of the movable gaging element 22 is indicated by the pointer of the indicator I to determine whether or not the diameter of the thread is within the allowable tolerances or between the arrows on the dial face which are set to the allowable tolerance limits. When the aligner is fixed the test thread is laid in the screw thread means of the aligner and the cooperating gaging elements 37 and 38. The test thread and cooperating gaging elements are then pivoted on pivot 39 into gaging position.

The gage of FIGS. 4 to 8 inclusive is of the type using solely two gaging elements, gaging rolls being shown, to engage the test thread T across the diameter thereof. The main frame is essentially the same with the upper head 21a carrying a guideway 53 which carries a slide 54 suitably mounted on the guideway for radial movement with respect to a test part in gaging position or towards and away from a cooperating gaging element. Preferably the slide has a ball bearing mounting using balls 55. The slide is pressed radially inwardly towards the cooperating gaging means by a spring means 56. The slide carries a first gaging means comprising a single gaging element, shown as a roll 58 with a V gaging ridge, rotatably mounted on a stud 59 carried by the slide. The main frame has indicator-mounting means shown as an indicator plate a socket or a hole in which the indicator stem is received. The position of the gaging element with a test thread in gaging position is indicated by the indicator with its contactor C engaging the end of the slide to indicate any deviation of the test thread from a perfect thread. The slide is provided with stop means such as a pin 60 carried by the head and engaging a larger hole 61 in the slide.

The other head 35a of the main frame carries an adjustable frame post 62 which is secured to the head by means of bolts 63 and a clamp plate 64 within a T slot 65. The post forms a part of the main frame. This post carries cooperating gaging means 66 which is a single gaging element and shown as a roll with a cone gaging ridge and rotatably mounted on a stud 67. This gaging element is in planar and diametrical alignment with the first gaging element 58 to engage the test thread T across a diameter.

An aligner is pivotally mounted adjacent to the gaging element 66. The aligner could be mounted on a pivot on the outside with respect to the main frame and gaging element and on a fixed aligner arm as shown in FIGS. 1 to 3. With a gage with two diametrically opposite gaging elements, the mounting for the aligner is somewhat different in order to give the aligner a backstop function.

In this gage a pivotal aligner arm 70 is pivotally mounted on an arm pivot 71 which conveniently is on the same axis as the gaging roll. This pivotal aligner arm carries an aligner pivot 72, spaced from the arm pivot, on which the aligner 73 pivots. The aligner has a concave surface which carries screw thread means 74. Preferably suitable axial adjustment means is provided for the aligner, that shown including an extension 75 of the aligner pivot which is received in a hole in the aligner arm and a lock screw 76 in the arm to engage the extension.

In a two-element gage as illustrated in FIGS. 4 to 8 inclusive, a test part should have a backstop of some sort so that the test thread is positively located across a diameter between the gaging elements. In order to assure this, the post is provided with an aligner stop bracket 80 and this bracket carries an adjustable stop screw 81 for engaging the back surface of the aligner and stopping its pivotal movement when the axis of the screw thread means 74 of the aligner coincides with the gaging axis X which would also be the axis of the test thread when in gaging position between the two gaging means or elements. In this construction, therefore, the aligner not only serves to prevent cross threading of a test thread between the gaging elements but also serves as a backstop for the test thread so that it is retained in proper gaging position across a diameter of the test thread when the aligner is in contact with the backstop. The aligner pivot 72 or the exterior portion thereof engages the top of the post 62 in its forward and rear positions to limit the pivotal movement of the aligner arm 70.

In using the gage of FIGS. 4 through 8 the aligner is in the position shown in FIG. 6. A test thread is laid into the concave surface of the screw thread means 74 whereupon the aligner and the test thread are raised upwardly and downwardly to swing the pivotal aligner arm 70 on its pivot 71 into a position in back of the gaging element 66 to the position shown in FIG. 4 and between the two gaging elements 58 and 66. With the aligner engaging the backstop 81, the test thread has its axis X in alignment, or closely in alignment, with the gaging elements so that the gaging elements engage the test thread across a diameter thereof. The position of the gage element 58 is indicated by the indicator I to determine whether or not the thread is within the allowable tolerances.

The gage of FIGS. 9–11 is another type of gage having three gaging elements. A main frame 85 of L form carries a head 86, in a slot 85a and the head is secured in the slot by screws 84 forming a part of this frame, and the head carries a first gaging means comprising a single gaging element 87. The head is provided with a guideway 88 in which is mounted a slide 89 secured to the guide by a clamp plate 90 and screws 91 which pass through a slot 92 in the slide. The slide has a flange 93 which receives an adjusting screw 94 for adjusting the position of the slide. The gaging element 87 is carried on the slide. The gaging element is a rotatable gaging roll and the roll is mounted on an eccentric stud 95.

Cooperating gaging means includes a pair of gaging elements 98 and 99 shown as rolls, carried by a pivoted gaging element frame 100 which has its pivot 101 on the main frame remote from the gaging elements. This gage differs further from the gage of FIG. 1 in that it is the pivotal gaging element frame which is connected with the indicator I to indicate any deviation of the diameter of the test thread from a perfect thread. This is accomplished by providing an indicator arm 102 attached to the gaging element frame to engage the contactor C of the indicator which is mounted in a socket or hole 103 in an indicator bracket 104 suitably secured to the main frame and forming a part thereof. The socket 103 provides indicator-mounting means. Spring means 105 propels the gaging element frame to closed position and handles 106 are used pivot the frame 100 to open position, dot-dash lines.

The guide 88 carries an aligner arm 107 secured thereto by screw 108 which bracket carries an aligner pivot means 109 having an aligner pivot 110. An aligner 111 is pivotally mounted on pivot 110 and has a concave surface carrying a screw thread means 112. A stop 113 may be provided for the aligner in open position. The axis of the pivot 110 is parallel with the gaging axis X. Since this is a gage which contacts the test thread at three points around the periphery thereof, the test thread assumes the proper gaging position by virtue of the three-point contact.

This gage is shown in a position for portable use with the aligner in open position shown in dot-dash lines. The handles 106 are pressed together to open the gage and the gage is projected onto the test thread T into contact with the gaging element 87 whereupon the aligner is pivoted to the full-line position with the screw thread means 112 in engagement with the test thread to align the latter. The handles are then released and the cooperating gaging elements 98 and 99 come into engagement with the proper thread helix of the test thread. The pointer of the indicator I indicates whether or not the diameter of the test thread is within the allowable tolerance.

FIGS. 12 to 15 inclusive show a screw thread gage for an internal thread T having an aligner. This gage is essentially that shown in application Ser. No. 607,329 filed Jan. 4, 1967. Basically it includes a main frame having a guide member 116 with three radially extending guideways 117 spaced angularly with respect to each other, preferably 120° apart. Each guideway carries slide means which preferably includes a slide 118 and a gaging element arm 119 secured thereto by screws 120. These arms may be replaced by a longer or shorter arms. Each arm carries a gaging element 121, such as a rotatable roll. At least one gaging roll and preferably all three rolls are suitably mounted on an eccentric stud 122. Spring means 123 presses each slide radially inwardly to bring the slide or particularly a slide roll 124 thereon into engagement with operating means for projecting each slide and its gaging element radially outwardly. The main frame also includes a sleeve 125 and an end member 126 having a bore 127 therethrough. The sleeve, end member and guide member secured together into a unitary main frame.

The operating means for radially expanding the slides and gaging elements includes an operating member 130 having a cone 131 at the end thereof which cone engages the slide rolls 124. The operating member is pressed to the right, as shown in FIG. 12, by an operating member spring 132 which surrounds a stem 133 forming a part of the operating member. The stem passes through the bore 127. This stem has a slot 134 therein in which is received one arm of an operating lever 135 pivoted on a pivot 136 carried by the end member of the main frame. Upon operation of the operating lever, the operating member is moved to the left to enable the springs 123 to contract the slides and their gaging elements radially inwardly for axial insertion into the internal thread T.

The position of the operating member and a hence of the gaging elements when engaging an internal thread is transferred through an indicator lever 139 pivotally mounted on a pin 140 carried by an indicator bracket 141 secured to the main frame and forming a part thereof. One arm of the indicator lever engages the stem of the operating member and the other arm engages the contactor C of an indicator I. The indicator bracket carries indicator-mounting means shown as a socket or hole 142 in which the stem of the indicator is secured.

One of the gaging element arms of the gage carries aligner pivot means 145 which is received in a socket or hole 146 in the arm. This pivot means carries an aligner pivot 147 on which an aligner 148 is pivotally mounted. For an internal thread gage, the aligner has concave surface having screw thread means 149 on this surface which is in helical alignment with the adjacent and other gaging elements. Since the aligner particularly shown does not have a separate mounting arm as in the other constructions the pivot 147 preferably is an eccentric stud as used for mounting the gaging rolls to allow adjustment of the position of the arc of the screw thread means to conform with arc of the test thread. The aligner may if desired use a separate mounting arm as shown for the other aligners. It is desirable that this aligner have axial adjustment so that its screw thread means may be brought into helical alignment with the adjacent gaging element. A simple form of adjustment is to move the pivot means axially within its socket and to lock it in adjusted position by a lock screw 150.

In using the internal thread gage, the gaging elements are contracted radially inwardly by pressing the operating lever 135 to project the operating member 130 to the left so that the gaging elements may be inserted axially into the internal thread. The aligner and its adjacent gaging element is placed in contact with a thread helix whereupon the operating lever is released and the projecting spring 132 projects the operating member to the right so that each slide and its gaging element is pressed outwardly into contact with the thread. The position of the gaging elements are indicated on the indicator I to determine whether or not the test thread is within the allowable tolerances.

It is clear that, in the described use of the internal thread gage, the gaging element adjacent to the aligner may be fixed on the main frame and the other two gaging elements solely expand radially into contact with the thread. The gage particularly illustrated, however, shows all three gaging elements radially movably, the effect of which is that not only do the cooperating gaging elements expand radially outwardly but the pressure of the projecting spring means 132 also centers the main frame on the axis of the test thread under the pressure of the operating spring means 132 and the operating member 130 contacting each of the slide rolls 124 of the gaging element slides. With the main frame of the gage centered on the axis of the internal thread, a test as to the centricity or squareness of another surface, such as the end surface of the test part which may be flat, conical or cylindrical, with respect to the thread may be secured on a second indicator suitably mounted on a bracket carried by a rotatable ring 153 carried by the main frame with the indicator contactor engaging the surface. By rotating the ring with the gage in the test thread any movement of the pointer of the second indicator will indicate whether or not this other surface is concentric or square with respect to the axis of the thread and the amount of any eccentricity or lack of squareness.

The gage of FIG. 12 may be used to gage an external thread in which event the tension of the projecting spring means 132 is reduced to be less than the cumulative effect of the spring means 123 which are selected for increased tension to overcome that of the projecting spring means. The gaging elements are projected inwardly thereby to engage the external thread and project the operating member 130 to the left. The aligner for this gage will have a convex surface with screw thread means as in the aligners of the gages of FIGS. 1, 4, and 9.

The gages illustrated show gaging rolls as the preferred gaging elements which provide gaging elements having a point, line or short circumferential extent of contact with the test thread. The aligner is suitable for gages having gaging elements of other forms with relatively short circumferential contact with the test thread.

FIGS. 15–17 show the gage of FIGS. 12–14 in which the aligner is mounted between the gaging means 121 and its supporting structure or the gaging element arm 119. In this particular gage the aligner-mounting means includes an aligner arm 156 which is mounted on a bushing 157. This bushing is secured to the arm by a screw 158 and clamps the arm in adjusted position. The aligner arm may, if desired pivot on this bushing merely by lengthening the bushing so that it does not clamp the arm. Manipulation is easier with an aligner arm clamped in position. The aligner 159 has an arcuate surface carrying screw thread means 160. Lateral adjustment of the aligner is secured by a rod or stem 161 forming part of the aligner pivot means which rod is received in a socket or bore in the aligner arm and locked in lateral adjusted position by a lock screw 162. The aligner is pivotally mounted on pivot means which includes a pivot 163.

This location for the aligner-mounting means between its support and the gaging element may be used for all of the other gages but it is not the best construction since, among other things, it increases the overhang of the gaging element 121 from its supporting member or gaging element arm 119 and also it would be somewhat more difficult to secure and assure axial parallelity between the three gaging rolls.

When the gaging elements are rolls, at least two rolls, and preferably the three gaging rolls, are rotatably mounted on eccentric studs so that the rolls may be adjusted to proper relationship with respect to each other and as to diameter.

The gages may be carried by a suitable base B for use on a bench and the test thread is brought to the gage or the gage may be a hand gage and brought to a test thread. For example, it often is desirable to test a thread on a part mounted between the centers of a thread grinder or lathe in which event the gage is brought to the test thread without removing the part from the machine and the gage and its aligner is manipulated in essentially the same way to prevent cross threading of the gage on the test thread.

The screw thread means on the aligner need not be as accurate as the thread means on an arcuate gaging segment. Although the aligner screw thread means may be a single gaging ridge or groove, preferably it comprises a plurality of screw threads or ridges. With a plurality of thread ridges on the aligner, the aligner not only prevents cross threading of the gaging elements on the test thread but it also prevents any twisting of the test thread between the gaging elements which would affect the indicator reading and the accuracy of the reading.

It has been mentioned that the screw thread means of the aligner is in axial alignment with the gaging elements. Because of the helix of the thread, the alignment is a thread or helix alignment whether the position of the aligner is in direct alignment with the gaging elements, as particularly illustrated in FIG. 5, or is axially spaced therefrom as illustrated with respect to the other gages. In the axially spaced position, or with the edge of the aligner in alignment, the gaging elements can engage a test thread adjacent to a shoulder on that test part. The aligner may have its edges ground to bring about helical alignment between the gaging elements and the screw thread means on the aligner. An easier way to secure alignment is to provide means for lateral or axial adjustment of the aligner with respect to the gaging elements. The adjustment shown for the gages of FIGS. 1, 4 and 9, 12 and 16 uses an aligner pivot means having a rod or stem providing additional length and is adjusted axially in its mounting bore. The aligner is locked in adjusted position by a lock screw.

The pivot for the aligner should be parallel with the axis of the test part or the central axis X of the gaging elements when in gaging position. This may be accomplished in various ways, however it is assured by mounting the pivot for the aligner in the same manner that parallelity is secured between the gaging elements by using studs with accurately squared ends as taught in U.S. Pat. No. 2,826,821.

Preferably the aligner is carried by gaging means which is radially fixed in the gages of FIGS. 1 to 11 although this is not essential. It is desirable that the weight of the aligner be not carried by the radially movable gaging means in a gage having a fixed and a radially movable gaging means. In a triroll gage of the type illustrated in FIGS. 1 and 9, it is desirable that the dial scale on the indicator be a standard dial. With gaging elements in this type of gage equally spaced apart by 120°, a standard dial may be used with a motion transfer ratio between the movable gaging means and the indicator contactor of 0.866. This is understood when it is considered that the triroll gage does not engage a test part across the diameter thereof but in effect engages the test part at 0.866 of the diameter. This ratio is readily determined for different angular relationships between the gaging elements as in FIG. 1 where the effective contact of the gaging elements is the distance between the single gaging element 22 and a line passing through the points of contact of the gaging elements 37 and 38 with the screw thread. Although the gage of FIG. 12 is a triroll gage this rule is not applicable to this gage because the indicator is responsive to the axial position of the operating member and the angularity of the cone carried thereby, hence in effect it is responsive to the gaging position of one gaging element. The dial of the indicator for this gage will be direct reading for an angularity in the cone in which the tangent of the cone angles is 0.5.

Preferably the aligner is pivotally mounted at a point spaced from one of the gaging elements and mounted on a separate aligner arm as shown in FIGS. 1, 4, 9 and 16. The reason for this is that the aligner can be easily adjusted to bring its screw thread means into circumferential correspondence with the test thread position or to bring the circular axis of the screw thread means into coaxial or closely approximately coaxial alignment with the axis X of the gage by adjustment of the aligner arm. In a construction in which pivotal adjustment of an aligner arm is not used, as in the gage of FIG. 12, adjustment for circumferential or coaxial alignment of the screw thread means is secured by the aligner pivot means having an eccentric mounting, such as an eccentric stud or bushing, on which the aligner is pivotally mounted.

The aligner usually will be mounted on the opposite side of the supporting frame carrying the adjacent gaging roll, as illustrated in the gages of FIGS. 1, 4 and 9. The aligner may be mounted on the same side of the supporting member 119 as the gaging roll, as illustrated in the gage of FIG. 12, but spaced from the gaging roll mounting or as illustrated in the gage of FIG. 16. The aligner arm and the eccentric bushing are means for adjusting the position of the arcuate screw thread means to bring its axis into coaxial alignment with the gage axis. Either the aligner arm construction or the unitary aligner and an eccentric bushing for its pivot may be used with any of the gages illustrated excepting with respect to the particular form of construction shown in FIG. 4 which uses a pivotal aligner arm and with the aligner in back of the gage when in gaging position so that the aligner also serves as a backstop. Should the pivotal aligner in this Figure be mounted to engage the opposite or front surface of the test thread in that event a separate backstop will be used for the test thread. In all of the gages illustrated using an aligner arm, the arm may be freely pivotal in which event the screw thread means of the aligner aligns itself properly for coaxial alignment with the gage axis. It is thought that manipulation of the aligner and the gage would be easier with an arm fixed in adjusted position.

The aligner should be of softer material than the test thread, such as of plastic or aluminum, so that it does not mar the test thread.

In all forms of the aligner illustrated, it is pivotally mounted at or adjacent to an end of the aligner, that is, in the region of the end of the aligner. The arcuate surface of the aligner will be concave for an external thread and convex for an internal thread so that the arcuate surface of the aligner is such that it engages the surface of the test thread or conforms thereto.

This invention is presented to fill a need for improvements in a dimensional thread gage with anti-cross-threading means. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A screw thread gage for gaging a test thread and adapted to carry an indicator having a contactor comprising frame means including a main frame, a first gaging means having at least one thread-gaging element and cooperating gaging means having at least one thread-gaging element, the gaging elements being spaced to engage the periphery of a test thread at least at two opposite points, the gaging elements having a dimension such as to engage the test thread over a small circumferential dimension thereof, the gaging means having a gaging axis, mounting means carried by the main frame and mounting one of the gaging means for movement radially or generally radially, mounting means carried by the main frame and mounting the other gaging means, the mounting means mounting the gaging means in gaging relationship with respect to each other with the gaging elements parallel to each other and the gage axis and axially located with respect to each other in accordance with the screw thread helix, indicator-mounting means carried by the main frame in a position to have the contactor of an indicator therein responsive to the position of the radially movable gaging means at gaging position, an aligner having solely one arcuate aligning surface in which the arcuate form is such as to engage the surface of the test thread and of substantial circumferential dimension to engage a substantial portion of the circumference of the test thread, the aligner having ends defined by the ends of the arcuate surface, screw thread means of arcuate form on the arcuate surface corresponding to the arcuate surface and corresponding in helix to the test thread and adapted to engage the latter including at least one screw thread, the screw thread means having an axis corresponding with the axis of the gage when in gaging position, aligner mounting means pivotally mounting the aligner in the region of an end thereof for positioning of its screw thread means to and from a position between a gaging element of the first gaging means and a gaging element of the cooperating gaging means and in axial alignment with the gage axis, the mounting means retaining the aligner in fixed axial position, and the screw thread means on the arcuate surface being spaced axially in relation to the gaging elements in accordance with the helix of the test thread.

2. A screw thread gage as in claim 1 in which the aligner mounting means includes adjusting means to adjust the aligner for coaxial alignment of its screw thread means with the gage axis.

3. A screw thread gage as in claim 2 in which the aligner adjusting means for coaxial alignment of the screw thread means with the gage axis includes an aligner arm mounted at one end thereof adjacent to a gaging element, and the aligner pivot means being mounted on the other end thereof.

4. A screw thread gage as in claim 2 in which the adjusting means for coaxial alignment of the screw thread means with the gage axis includes eccentric means forming a part of the aligner pivot means.

5. A screw thread gage as in claim 1 in which the aligner-mounting means includes lateral adjusting means to adjust the screw thread means of the aligner into helical alignment with a thread-gaging element.

6. A screw thread gage as in claim 5 in which the lateral adjusting means includes a rod carried by the aligner pivot means, and a socket receiving the rod for axial adjustment therein.

7. A screw thread gage as in claim 2 in which the aligner-mounting means includes lateral adjusting means to adjust the screw thread means of the aligner into helical alignment with a thread-gaging element.

8. A screw thread gage as in claim 1 in which the cooperating gaging means includes a gaging means frame, the gaging means being a pair of gaging elements carried by the gaging means frame angularly spaced with respect to the first gaging means and to each other to engage the periphery of a test thread oppositely from the engagement therewith of the gaging element of the first gaging means, and a gaging means frame pivot carried by the main frame and pivotally mounting the gaging means frame.

9. A screw thread gage as in claim 8 in which the gaging means frame pivot is located on this frame in a region between the two gaging elements and radially fixed, the first gaging means being mounted for radial or generally radial movement towards and away from the cooperating gaging means, and the aligner-mounting means being carried by the gaging means frame.

10. A screw thread as in claim 8 in which the gaging means frame pivot is spaced away from the two gaging elements carried by the gaging means frame, the first gaging means being radially fixed, an indicator connection from the gaging means frame to a point adjacent the indicator-mounting means for engagement with the contactor of an indicator and the aligner-mounting means being carried by the main frame adjacent to the gaging element of the first gaging means.

11. A screw thread gage as in claim 1 in which the cooperating gaging means comprises a single gaging element located in diametrical alignment with the gaging element of the first gaging means, the aligner-mounting means including aligner pivot means to pivot the aligner to and from aligning position, and stop means carried by the main frame and limiting movement of the test part to gaging position.

12. A screw thread gage as in claim 11 in which the stop means is located to be engaged by the aligner when the axis of its screw thread means is in coaxial alignment with the gaging axis.

13. A screw thread gage as in claim 11 in which the gaging elements are rolls, studs rotatably mounting the rolls and having an axis, the mounting means for the aligner including an arm having one end pivotally mounted coaxially with the stud and the other end of the arm carrying the pivot means for the aligner.

14. A screw thread gage as in claim 13 in which the stop means is located to be engaged by the aligner when the axis of its screw thread means is in coaxial alignment with the gage axis.

15. A screw thread gage as in claim 1 in which the cooperating gaging means includes two gaging means, a radial guideway mounting each cooperating gaging means for radical movement, operating means connected with the cooperating gaging means to expand and contract the same including an operating member, the indicator-mounting means adjacent to the operating member, and a connection between the operating member to a point adjacent the indicator-mounting means to actuate an indicator when in gaging position, and the aligner being carried by the first gaging means.

16. A screw thread gage as in claim 15 including a radial guideway mounting the first gaging means for radial movement, and the first gaging means being contracted and expanded by the operating means.

* * * * *